Aug. 7, 1962   P. J. LINDER   3,048,437
TRACTOR-SEMITRAILER COMBINATION
Filed March 17, 1961
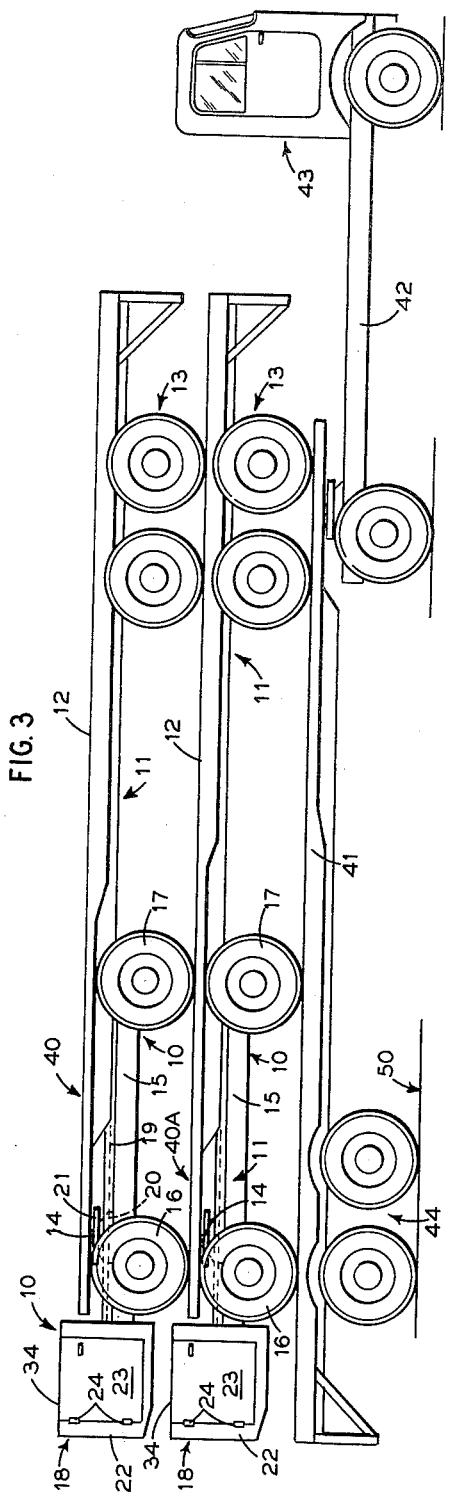
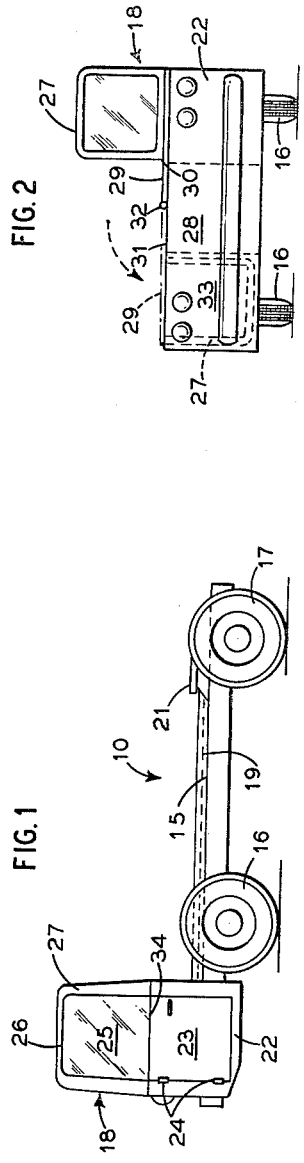
*INVENTOR.*
Peter J. Linder
BY
Philip G. Hilbert
ATTORNEY

United States Patent Office 3,048,437
Patented Aug. 7, 1962

3,048,437
TRACTOR-SEMITRAILER COMBINATION
Peter J. Linder, 320 Burd St., Pennington, N.J.
Filed Mar. 17, 1961, Ser. No. 96,405
9 Claims. (Cl. 296—1)

This invention relates to a combination tractor and semitrailer.

Conventional tractor-semitrailers present a problem when there is no return load and the combination must be driven back to its home base empty. Not only is there no revenue load on the return trip, but in addition, there is a driver's expense, with a driver required for each returning tractor-semitrailer. Thus, overhead charges are substantially increased in this type of transportation; and in addition, highway traffic is augmented by long-haul, no-load tractor-trailer combinations on their return trips.

It has been proposed to combine several tractor-trailer combinations into carrier-cargo units for no-load return trips. Thus, a single semi-trailer of a carrier unit may be loaded with two superposed semi-trailers; while another semi-trailer of another carrier unit may carry two tractors in tandem relation. However, in this case, two drivers are still required to move a total of four tractor-trailer combinations; and further, the two carrier units must be coordinated in arrival time so that their respective tractors and trailers, carried as cargo, may be reunited with minimum loss of time.

Accordingly, one object of this invention is to provide an improved tractor-semitrailer combination having structural features permitting two complete tractor-semitrailer combinations to be carried by a third tractor-semitrailer combination, thereby minimizing the manpower required for no-load return trips of tractor-semitrailer combinations.

The principal limitation on the amount of cargo carried by a flat bed semitrailer, aside from weight, is the height limit imposed by the various states on their respective highways. With height limitations of 12'6" to 13'6" on a large number of different state highways, there is automatically imposed a limitation as to the number of conventional tractor-trailers which may be carried as cargo on a flat bed semitrailer.

Accordingly, another object of this invention, is to provide an improved tractor having structural features allowing the normal cab height to be reduced materially when such tractor is being carried as cargo on a flat bed semitrailer, thereby allowing such tractors to be carried in superposed relation yet not exceeding highway height limitations.

A further object of this invention is to provide an improved tractor for tractor-trailer combinations wherein the normal overall height of the cab thereof may be materially reduced when necessary, as by moving, tilting or otherwise disposing the upper portion of the cab to effect the reduction on overall tractor height.

Still another object of this invention is to provide an improved tractor wherein the driver's compartment is located forwardly of the front axle and in a depressed position to lower such compartment to reduce the normal overall height of the compartment, the compartment including an upper portion which is movable in a manner and to a position, which effects a further reduction in the overall height of the compartment.

Yet another object of this invention is to provide an improved tractor-semitrailer combination wherein the tractor includes a slidable fifth wheel for connection to the semitrailer, the fifth wheel being movable to its most advanced position on the tractor to reduce the overall length of the combination and to allow the same to be carried as cargo on a flat bed trailer, said tractor having a cab structure which may be reduced as to height to allow a pair of such tractor-trailer combinations to be carried in superposed relation as cargo on said flat bed trailer.

Other objects of this invention will in part be obvious and in part hereinafter pointed out.

In the drawing,

FIG. 1 is a side elevational view of a tractor unit embodying the invention;

FIG. 2 is a front elevational view thereof;

FIG. 3 is a side elevational view showing a pair of superposed tractor-trailer combinations embodying the invention, as the same are carried by a cargo tractor-trailer combination.

In accordance with the instant invention, the tractor-trailer combination embodying the same comprises essentially a flat bed trailer or semitrailer and a novel tractor or truck for use therewith; such tractor or truck having a cab constructtion which allows the normal height thereof to be materially reduced to permit the tractor to be carried as cargo on a trailer with a minimum projection above the trailer bed; and further, to permit two such tractor-trailer combinations to be carried in superposed relation on a carrier trailer with an overall height within preset highway height limitations. Furthermore, the cab of the novel tractor is located forwardly of the front axle, allowing the cab to be depressed and thereby reduce the elevation of the cab in its normal position.

Referring in detail to the drawing, 10 designates the novel tractor embodying the invention, which is associated with a flat bed semitrailer 11. Semitrailer 11 includes the usual elongated flat bed 12 with a pair of tandem axles and wheels generally indicated at 13, at the rear of bed 12. Bed 12 is provided with the usual hitch pin 14 at its forward end.

Tractor 10 comprises frame 15 with front wheels 16 and rear wheels 17. Front wheels 16 are set well back of the front end of the tractor to allow the cab generally designated at 18 to be located forwardly of said wheels 16 and in a depressed position to lower the upward projection of the same. On the rear portion of frame 15 there are mounted a pair of longitudinally extending rails 19 on which is slidably mounted a fifth wheel mounting plate 20 carrying the usual fifth wheel 21. Such slidable arrangement of the fifth wheel is known in the art, and the same may be locked in selected positions relative to rails 19, by known means, not shown. The slotted fifth wheel 21 is adapted to receive pin 14 on trailer 11, in a manner known in the art to couple the trailer 11 to tractor 10.

Cab 18 on tractor 10, forming the driver's compartment, comprises a lower fixed portion 22 including a door 23 hinged at its forward side edge as at 24. A window 25 is mounted in door 23 for raised and lowered movement, and in its raised position fits into opening 26 in upper cab portion 27; said cab portion 27 being movably related to fixed cab portion 22.

Cab 18 is located on one side of the medially disposed power plant 28 of tractor 10. A bracket 29 is fixed at one end to the lower inner side edge 30 of movable cab portion 27; the other end of said bracket 29 being longitudinally hinged to a mid portion of the hood 31 of power plant 28, as at 32. An open top frame casing 33 is located on the other side of power plant 28 for receiving therein the movable cab portion 27 when said cab portion is tilted about its hinge connection 32, to assume a position within said casing 33 as indicated in dotted lines.

It is understood, that window 25 is lowered to a depressed position entirely within door 23, when upper cab portion 27 is to be moved into casing 33. Thus, the overall height of cab 18 is now reduced to the level of the top edge 34 of fixed cab portion 22. It will be apparent, as indicated in FIG. 3, that the peripheral edge 34 defines a horizontal plane in cab portion 22 which is free of any upstanding projections which extend above said horizontal plane. Joint sealing means, not shown, may be used to insure a tight joint between cab portions 22, 27 when cab portion 27 is in its elevated, operative position. Also, suitable means, not shown, is provided for locking upper cab portion 27 in alignment with lower cab portion 22, when tractor 10 is in normal use.

Assuming that tractor 10 and an associated trailer 11 is to be carried as cargo; a pair of such tractor-trailer combinations, indicated generally at 40, 40A, may be carried in superposed relation on a flat bed trailer 41 associated with a carrier tractor 42. Tractor 42 may be a conventional tractor with the usual fixed overall cab 43, or may be similar to tractor 10 described above.

Before loading tractor-trailer combinations 40, 40A on trailer 41, the upper cab portions 27 are tilted into their depressed positions within casings 33. Also, the fifth wheels 21 on tractors 10 are fully advanced so as to shorten the overall length of the tractor-trailer combinations 40, 40A and allow the same to be accommodated on trailer 41. Preferably, the combinations 40, 40A are disposed in reversed relation on said trailer 41 to locate the maximum weight of such combinations over the rear tandem wheels 44 of trailer 41.

Assuming that trailer 41, as well as trailers 11 have a height of the order of 50-54", then the overall height of the loaded trailers on trailer 41 will be within the maximum highway height limitations. Also, the top edge 34 of the uppermost tractor 10 will project only slightly above the bed of the associated trailer 11. Also, tractors 10 may be provided with air springs of conventional type, which permits a further reduction in height of the tractors when carried as cargo, upon deflation of said springs.

While movable cab portion 27 of tractor 10 is shown as arranged for hinged, tilted movement to allow the same to be disposed in a depressed position, it is understood that cab portion 27 may be otherwise arranged or connected to allow movement thereof to positions resulting in a reduction of the normal height of cab 18; thus allowing said tractors 10 in association with trailers 11 to be loaded in superposed relation on a single carrier trailer, as described above.

While the novel tractor has been described as particularly lending itself to carriage on trailers as cargo with a reduction in overall height; it will be apparent that such tractors, alone, or in combination with associated trailers may also be conveniently and compactly loaded on various carriage means including trailers generally, railroad flat cars, cargo boats and the like. Also, the movable type cab construction herein disclosed may be applied to vehicles generally including trucks and the like, to render such vehicles convertible to compact form to facilitate shipping the same in stacked conditions, thereby materially reducing the shipping bulk of the individual vehicles.

As various changes might be made in the embodiment of the invention herein disclosed without departing from the spirit thereof, it is understood that all matter herein shown or described shall be deemed illustrative and not limiting except as set forth in the appended claims.

Having thus disclosed my invention, I claim as new and desire to protect by Letters Patent:

1. In combination, a carrier tractor and a first flat bed trailer connected thereto, second and third tractors and respectively associated trailers in superposed relation to each other and carried as cargo on said first trailer, each of said second and third tractors having a driver's compartment normally projecting substanially above the bed of the associated trailer, said compartment comprising a fixed lower portion and an upper portion movable to a depressed portion, said fixed compartment portion having a top peripheral edge defining a horizontal plane only slightly above the bed of the associated trailer and being free of any projections extending above said horizontal plane.

2. In combination, a carrier tractor and a carrier flat bed trailer operatively connected thereto, a pair of combination tractor-trailers carried in superposed relation on said carrier trailer, as cargo, each of said cargo trailers being slidably connected with its associated cargo tractor for relative contracted longitudinal movement to permit carriage thereof on said carrier trailer, each of said cargo tractors having an upstanding driver's compartment including a movable upper portion and a fixed lower portion, the upper compartment portions being movable to depressed positions relative to said lower compartment portions, said lower compartment portions having top peripheral edge portions defining horizontal planes and being free of any projections extending above said horizontal planes; said depressed upper compartment portions having all portions thereof terminating in said horizontal planes.

3. In combination, a tractor and a flat bed trailer associated therewith, said tractor having an upstanding cab, said cab comprising a fixed lower portion and a movable upper portion, said movable cab portion being movable from its normal position to a position depressed relative to said normal position, said fixed cab portion having a top peripheral edge defining a horizontal plane and being free of any projections extending upwardly above said horizontal plane.

4. In combination, a tractor and a flat bed trailer associated therewith, said tractor having an upstanding cab, said cab comprising a fixed lower portion and a movable upper portion, said movable cab portion being movable from its normal position to a position depressed relative to said normal position, the top edge of said fixed cab portion constituting the effective overall reduced height of said cab, said cab being located on one side of said tractor and laterally related to the power plant thereof, said tractor including a casing on the other side of said power plant, and means for movably mounting said upper cab portion for movement from its normal elevated position in alignment with said fixed cab portion to a depressed position within said casing.

5. A tractor comprising a centrally disposed power plant, an upstanding driver's compartment on one side of said power plant, said compartment comprising a fixed lower portion and a movable upper portion, and means on the other side of said power plant for receiving the movable upper portion of said compartment, said lower compartment portion having a top peripheral edge defining a horizontal plane, said lower compartment portion and the upper compartment portion in its position on the other side of said power plant being free of projections extending upwardly above said horizontal plane.

6. A tractor as in claim 5 and further including hinge means connected to said movable upper compartment portion for hingedly moving said movable upper compartment portion between an operative position thereof in vertical alignment with said fixed lower compartment portion and an inoperative position in said receiving means.

7. A vehicle including an upstanding driver's compartment, said compartment comprising upper and lower portions having meeting edges disposed in a common horizontal plane located substantially medially of the overall height of said compartment, said upper compartment portion being movably related to said lower compartment portion whereby said upper compartment portion may be moved from its normal position relative to said lower compartment portion to a depressed position in which said upper and lower compartment portions are free of upstanding projections extending above said horizontal plane and the resultant effective height of said compartment extends only to said horizontal plane.

8. A vehicle as in claim 7 wherein the lower edge portion of said upper compartment portion is hingedly connected to the upper edge portion of the lower compartment portion to allow tilted movement of said upper compartment portion to a position laterally adjacent said lower compartment portion.

9. A tractor comprising an upstanding driver's compartment located forwardly of the front axle thereof and in a depressed relation thereto, said compartment comprising a fixed lower portion and a movable upper portion, means allowing movement of said movable portion to a position laterally related to said fixed portion, said fixed compartment portion having a top edge defining a horizontal plane, said fixed compartment portion and said movable compartment portion in its moved position being free of projections extending above said horizontal plane.

References Cited in the file of this patent

UNITED STATES PATENTS

| | | |
|---|---|---|
| 2,362,453 | Cosper | Nov. 14, 1944 |
| 2,416,478 | Harbers | Feb. 25, 1947 |
| 2,781,102 | Prichard | Feb. 12, 1957 |
| 2,838,126 | Gleasman | June 10, 1958 |
| 2,868,560 | Perry et al. | Jan. 13, 1959 |

FOREIGN PATENTS

| | | |
|---|---|---|
| 1,001,565 | France | Oct. 24, 1951 |
| 826,549 | Germany | Jan. 3, 1952 |